(12) United States Patent
Hur et al.

(10) Patent No.: US 7,173,683 B2
(45) Date of Patent: Feb. 6, 2007

(54) WIRE FOR LIQUID CRYSTAL DISPLAYS, LIQUID CRYSTAL DISPLAYS HAVING THE SAME, AND MANUFACTURING METHODS THEREOF

(75) Inventors: Myung-Koo Hur, Kyungki-do (KR); Chang-Oh Jeong, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/196,185

(22) Filed: Nov. 20, 1998

(65) Prior Publication Data

US 2002/0047947 A1 Apr. 25, 2002

(30) Foreign Application Priority Data

Nov. 20, 1997 (KR) .................................... 97-61315

(51) Int. Cl.
  G02F 1/1343 (2006.01)
  G02F 1/136 (2006.01)
(52) U.S. Cl. .................. 349/147; 349/139; 349/42
(58) Field of Classification Search ............... 349/42, 349/43, 139, 147, 46; 438/149, 151, 155; 428/155
See application file for complete search history.

(56) References Cited

U.S. PATENT DOCUMENTS

| | | | | |
|---|---|---|---|---|
| 4,141,022 A | * | 2/1979 | Sigg et al. ................ 257/384 |
| 5,162,933 A | * | 11/1992 | Kakuda et al. ............ 349/46 |
| 5,334,860 A | * | 8/1994 | Naito ........................ 257/59 |
| 5,428,250 A | * | 6/1995 | Ikeda et al. ................ 349/147 |
| 5,681,761 A | * | 10/1997 | Kim ........................... 437/21 |
| 5,751,381 A | * | 5/1998 | Ono et al. .................. 349/42 |
| 5,849,611 A | * | 12/1998 | Yamazaki et al. ......... 438/151 |
| 5,852,481 A | * | 12/1998 | Hwang ...................... 349/43 |
| 5,932,484 A | * | 8/1999 | Iwanaga et al. ........... 438/689 |
| 6,008,065 A | * | 12/1999 | Lee et al. ................... 438/30 |
| 6,011,277 A | * | 1/2000 | Yamazaki .................. 257/66 |
| 6,043,859 A | * | 3/2000 | Maeda ....................... 349/143 |

(Continued)

FOREIGN PATENT DOCUMENTS

JP 62-112128 * 5/1987

(Continued)

Primary Examiner—Andrew Schechter
Assistant Examiner—Mike Qi
(74) Attorney, Agent, or Firm—Don C. Lawrence; MacPherson Kwok Chen & Heid LLP

(57) ABSTRACT

A wire for a liquid crystal display has a dual-layered structure comprising a first layer made of molybdenum or molybdenum alloy, and a second layer made of molybdenum nitride or molybdenum alloy nitride. To manufacture the wire, a layer made of either a molybdenum or a molybdenum alloy, and another layer one of either a molybdenum nitride or molybdenum alloy nitride by using reactive sputtering method are deposited in sequence, and then patterned simultaneously. The target for reactive sputtering is made of either molybdenum or molybdenum alloy, and the molybdenum alloy comprises one selected from the group consisting of tungsten, chromium, zirconium, and nickel of the content ratio of 0.1 to less than 20 atm % of. The reactive gas mixture for reactive sputtering includes an argon gas and inflow amount of the nitrogen gas is at least 50% of argon gas, to minimize the etch rate of the molybdenum nitride layer or the molybdenum alloy nitride layer for ITO etchant.

7 Claims, 6 Drawing Sheets

U.S. PATENT DOCUMENTS 6,051,883 A * 4/2000 Nakamura .................. 257/768
6,081,308 A * 6/2000 Jeong et al. .................. 349/42
6,107,668 A * 8/2000 Ukita ......................... 257/412
6,219,125 B1 * 4/2001 Ishikura et al. ............. 349/147
6,486,494 B2 * 11/2002 Jeong et al. ................. 257/59

FOREIGN PATENT DOCUMENTS

| | | | |
|---|---|---|---|
| JP | 4-372934 | * | 12/1992 |
| JP | 5-241173 | * | 9/1993 |
| JP | 05-241173 | * | 9/1993 |
| JP | 254680 | | 8/1996 |
| JP | 8-254680 | * | 10/1996 |

* cited by examiner

WIRE FOR LIQUID CRYSTAL DISPLAYS, LIQUID CRYSTAL DISPLAYS HAVING THE SAME, AND MANUFACTURING METHODS THEREOF

BACKGROUND OF THE INVENTION (1) Field of the Invention

The present invention relates to wires for liquid crystal displays (LCDs), LCDs having the same and manufacturing methods thereof.

(2) Description of the Related Art

In general, an LCD has a gate wire on a substrate, and the gate wire includes gate lines, gate pads and gate electrodes which transmits scanning signals. The gate wire is covered with a gate insulating layer, and a semiconductor layer is formed on portions of the gate insulating layer opposite is the gate electrodes. The LCD also has a data wire on the gate insulating layer, and the data wire includes data lines, data pads and source electrodes transmitting image signals and drain electrodes connected to the source electrodes through the semiconductor layer. A passivation layer having a contact hole exposing the drain electrode is formed on the data wire, and pixel electrodes which are formed of a transparent conductive material such as ITO (indium tin oxide) and connected to the drain electrodes through the contact hole are formed thereon.

To manufacture the liquid crystal display, deposition, photolithography and etch steps are required to form the gate wire, the data wire, the gate insulating layer, the passivation layer and the pixel electrodes.

There are two general methods for depositing a thin film, a chemical vapor deposition (CVD) and a physical deposition. The CVD forms the film by the reaction of vaporized chemicals that contain the required constituents, while a sputtering which is a kind of physical deposition obtains the film by having energetic particles to strike target to be sputtered physically. The CVD is generally used to form the semiconductor layer and insulating layers such as the gate insulating layer and the passivation layer, and the sputtering is used to form metal layers for the gate wire and the data wire and an ITO layer for the pixel electrodes.

The etch method is divided into two types, wet etch using etchants and dry etch using etching gases.

In particular, when an ITO layer is etched by using an etchant, hydrochloric acid and nitric acid are used. However, it may happen that the etchant penetrates the passivation layer, contacts the data wire and the gate pad, and then erode the data wire and the gate pad. Accordingly, the data wire and the gate pad may be disconnected and/or eroded.

SUMMARY OF THE INVENTION

In view of the above, it is an object of the present invention to provide a data wire highly endurable against a chemical reactive etchant.

A wire according to the present invention is made of either molybdenum nitride layer or molybdenum alloy nitride layer.

The manufacturing method of the wires according to the present invention uses a reactive sputtering method, and the target for the reactive sputtering may be made of a molybdenum alloy including one selected from tungsten, chromium, zirconium and nickel of 0.1 to less than 20 atm %. The reactive gas mixture used for the reactive sputtering may include argon gas and nitrogen gas, and the inflow amount of the nitrogen gas is at least 50% of that of the argon gas.

Because the wires according to the present invention have a low etch rate for the ITO etchant including strong acid, the chances of wire disconnection are reduced.

DETAILED DESCRIPTION OF THE PREFERRED EMBODIMENTS

Figure 1:
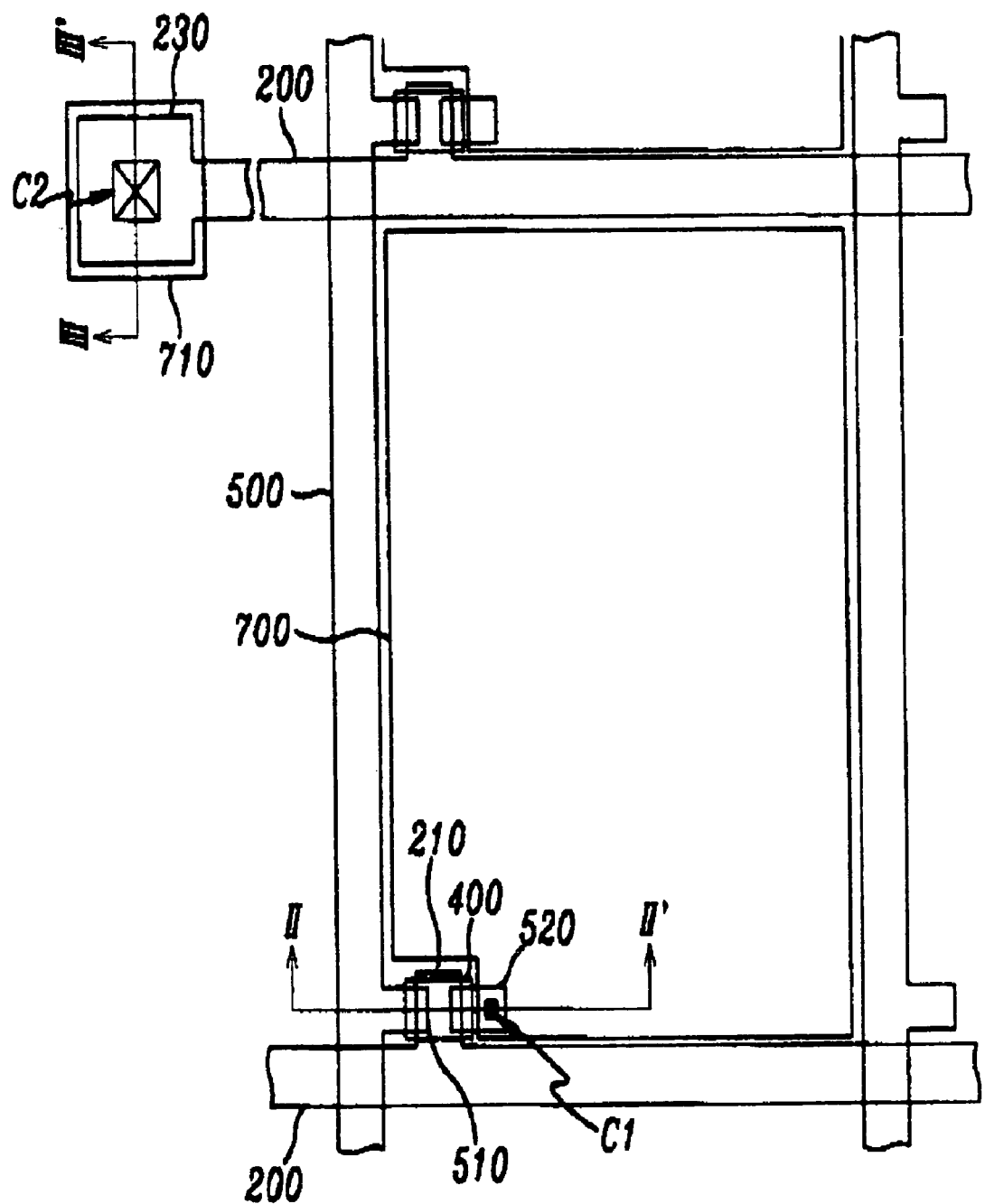
FIG. 1 shows a layout view of a thin film transistor (TFT) array panel according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 2:
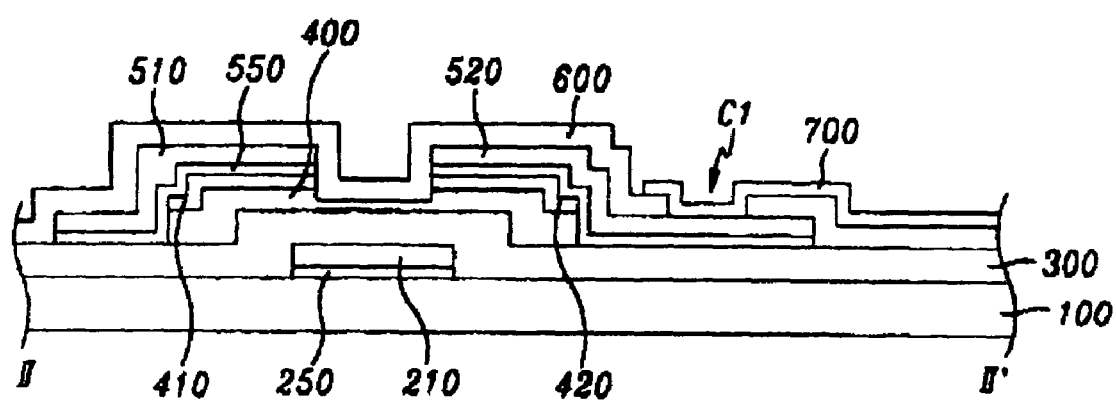
FIGS. 2 and 3 show sectional views of the TFT array panel taken along the lines II–II' and III–III' in FIG. 1, respectively.
Figure 3:
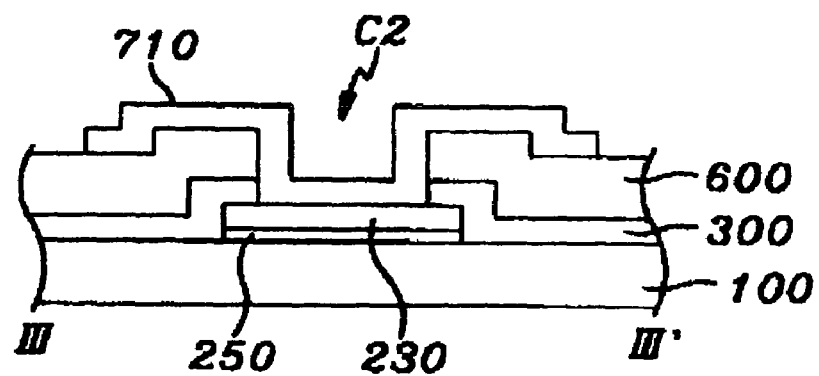

FIG. 1 shows a layout view of a TFT array panel according to an embodiment of the present invention, and FIGS. 2 and 3 show sectional views taken along the lines II–II' and III–III' in FIG. 1, respectively.

The structure of the TFT array panel according to an embodiment of the present invention includes a supplementary wire highly endurable against a chemical reactive etchant to prevent disconnections of signal lines.

A gate wire made of either molybdenum or molybdenum alloy is formed on an insulating substrate 100, and the gate wire has a thickness of 1,000–4,000 Å and includes a transverse gate line 200, a gate electrode 210, which is a branch of the gate line 200, and a gate pad 230 which is connected to one end of the gate line 200. A supplementary gate wire 250 having a thickness of 300–1,000 Å is formed under the gate wire 200, 210 and 230 and made of either molybdenum nitride ($MoN_x$) or molybdenum alloy nitride (Mo-alloy-$N_x$). The supplementary gate wire 250 may be located on the gate wire 200, 210 and 230. The molybdenum alloy used in this embodiment comprises one selected from tungsten, chromium, zirconium and nickel of the content of 0.1 to less than 20 atm %.

A gate insulating layer 300 covers the gate wire 200, 210 and 230, a hydrogenated amorphous silicon (a-si:H) layer 400 and a doped hydrogenated amorphous silicon layer 410 and 420 including N type impurity are sequentially formed on the gate insulating layer 300 opposite the gate electrode 210, and the portions 410 and 420 of the doped amorphous silicon layer are opposite each other with respect the gate electrode 210.

A data line 500 in the longitudinal direction is formed on the gate insulating layer 300, a source electrode 510 which is a branch of the data line 500 is formed on the one portion 410 of the doped amorphous silicon layer, and a drain electrode 520 opposite the source electrode 510 with respect to the gate electrode 210 is formed on the other portion 420 of the doped amorphous silicon layer. Here, the data wire including the data line 500, the source and drain electrodes 510 and 520 is made of either molybdenum or molybdenum alloy.

A supplementary data wire 550 made of either molybdenum nitride or molybdenum alloy nitride is formed under the data wire 500, 510 and 520. The molybdenum alloy used in this embodiment comprises one selected from tungsten, chromium, zirconium, and nickel of the content of 0.1 to less than 20 atm %. The supplementary data wire 550 may be located on the data line 500.

A passivation layer 600 is formed on the data wire 500, 510 and 520 and portions of the amorphous silicon layer 400 which is not covered by the data wire 500,510 and 520. The passivation layer 600 has a contact hole C1 exposing the drain electrode 520, and another contact hole C2 exposing the gate pad 230 along with the gate insulating layer 300. Here, the description of a data pad connected to the data line 500 is omitted.

Finally, a pixel electrode 700 formed of ITO (indium tin oxide) and connected to the drain electrode 520 through a contact hole C1 is formed on the passivation layer 600. Furthermore, a gate ITO layer 710 connected to the gate pad 230 through the contact hole C2 and improving the contact characteristics is formed on the passivation layer 600.

A manufacturing method of the TFT array panel will now be described specifically with reference to FIGS. 4A–4F.

FIGS. 4A–4F show cross sectional views of the intermediate structures of the TFT array panel shown in FIG. 1 to FIG. 3 manufactured by a manufacturing method according to the embodiment of the present invention.

Figure 4A:
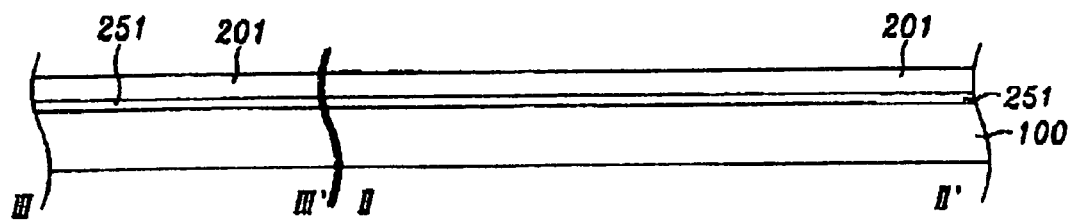
FIGS. 4A–4F are sectional views of the intermediate structures of the TFT array panel shown in FIG. 1 to FIG. 3 manufactured by a manufacturing method according the embodiment of the present invention.

As shown in FIG. 4A, a nitride layer 251 made of either molybdenum nitride or molybdenum alloy nitride is deposited on a transparent insulating substrate 100 by using a reactive sputtering method. The target for the reactive sputtering is made of either molybdenum and molybdenum alloy having one selected from tungsten, chromium, zirconium, and nickel of the content ratio of 0.1 to less than 20 atm %. A reactive gas mixture includes argon gas (Ar) and nitrogen gas ($N_2$), and the inflow amount of the nitrogen gas is no smaller than a half of argon gas. Thereafter, a metal layer 201 made of either molybdenum or molybdenum alloy is deposited by sputtering. The metal layer 201 may be deposited before the deposition of the nitride layer 251.

Figure 4B:
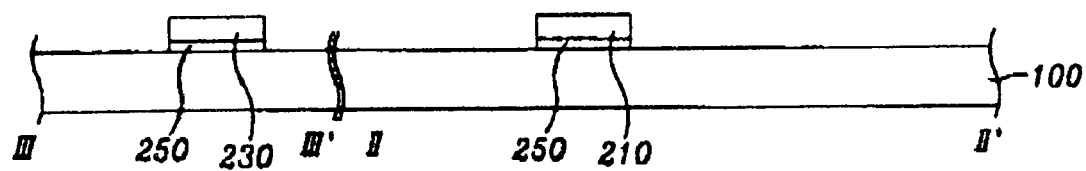

As shown in FIG. 4B, the metal layer 201 and the nitride layer 251 are sequentially patterned to form a gate wire including a gate line 200, a gate electrode 210 and a gate pad 230, and a supplementary gate wire 250 by performing a wet etch using an etchant such as aluminum etchant comprising nitric acid, acetic acid, phosphoric acid and dionized water.

Figure 4C:
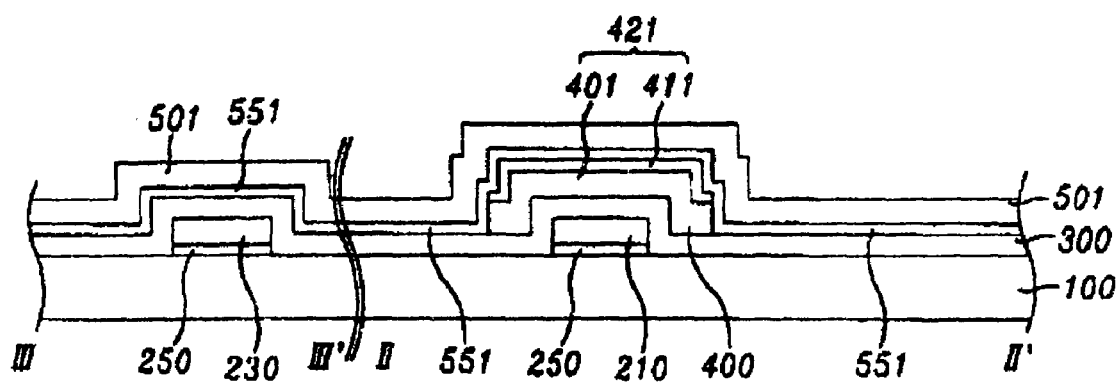

As shown in FIG. 4C, a gate insulating layer 300 made from silicon nitride, a hydrogenated amorphous silicon layer and an extrinsic or doped hydrogenated amorphous silicon layer highly doped with N type impurity are sequentially deposited by plasma-enhanced chemical vapor deposition (PECVD hereafter). The amorphous silicon layer and the extrinsic amorphous silicon layer are patterned by photolithography to form an active pattern 401 and 411. A nitride layer 551 made of either molybdenum nitride or molybdenum alloy nitride with the thickness of 300~1,000 Å is deposited by using reactive sputtering method, and a metal layer 501 made of either molybdenum or molybdenum alloy with the thickness of 1,000–4,000 Å is deposited. The metal layer 501 may be deposited before the deposition of the nitride layer 551. When the thickness of the nitride layer 551 is less than 300 Å, it is difficult to obtain the uniform thickness, and the thickness of more than 1,000 Å affects the following etch step.

Figure 4D:
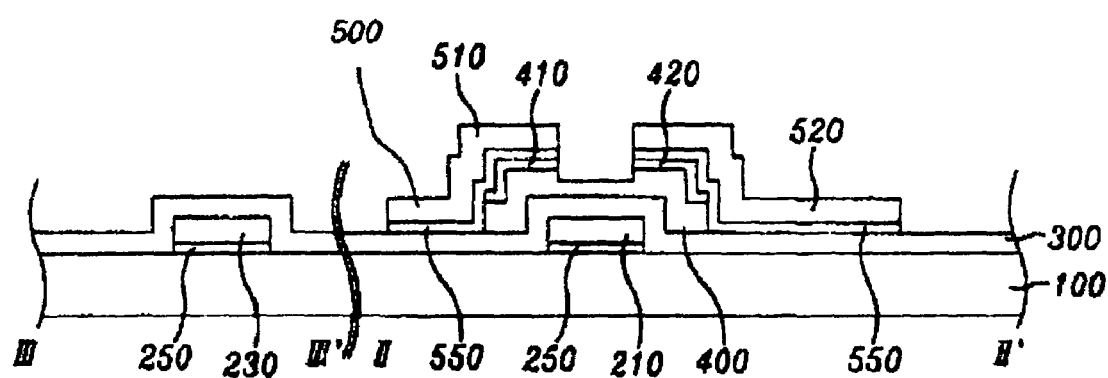

As shown in FIG. 4D, the metal layer 501 and the nitride layer 551 are sequentially patterned to form a data wire including a data line 500, a source electrode 510, a drain electrode 520, and a data pad (not shown), and a supplementary wire 550 by performing wet-etch using the above-described aluminum etchant. Because the etch rate for the upper metal layer 501 is higher than the etch rate for the low nitride layer 551, the metal layer 501 may be over-etched. Accordingly, it is desirable that the thickness of the nitride layer 551 is less than 1,000 Å to prevent the over-etch of the metal layer 501.

Thereafter, exposed portions of the extrinsic amorphous silicon layer 411 are removed such that the extrinsic amorphous silicon layer is then divided into two portions 410 and 420, and the central portion of the amorphous silicon layer 400 is ex-posed.

Figure 4E:
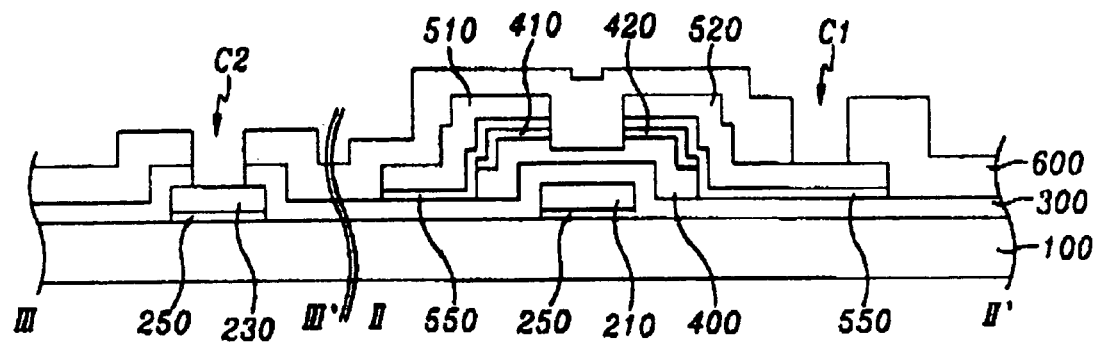
Figure 4F:
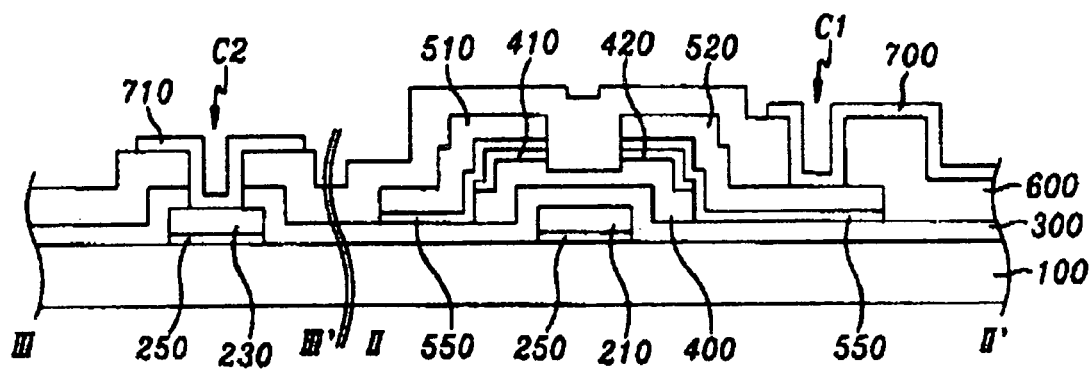

As shown in FIG. 4E, a passivation layer 600 is deposited and patterned along with the gate insulating layer 300 to form contact holes C1 and C2 exposing the drain electrode 520 and the gate pad 230, respectively Finally, an ITO layer is deposited and patterned to form a pixel electrode 700 connected to the drain electrode 520 through the contact hole C1 and a gate ITO layer 710 connected to the gate pad 230 through the contact hole C2, as shown in FIG. 4F. Here, the etchant for the ITO layer comprises hydrochloric acid and nitric acid, which may penetrate along the crack of the passivation layer 600 or along the edges of the ITO wire 700 and 710, and then may reach the data wire 500, 510 and 520, and the gate pad 230.

However, because the supplementary gate wire 250 and the supplementary data wire 550 have a low chemical reaction against the ITO etchant, the gate wire 200, 210 and 230, and the data wire 500, 510 and 520 through the supplementary gate wire 250 and the supplementary data wire 550 are not disconnected.

Next, the etch rate of a molybdenum-tungsten alloy nitride layer as function of volume of nitrogen gas as a reactive gas for aluminum and ITO etchants is described to confirm the low chemical reaction of the supplementary gate and data wires 250 and 550 for aluminum and ITO etchants.

Figure 5:
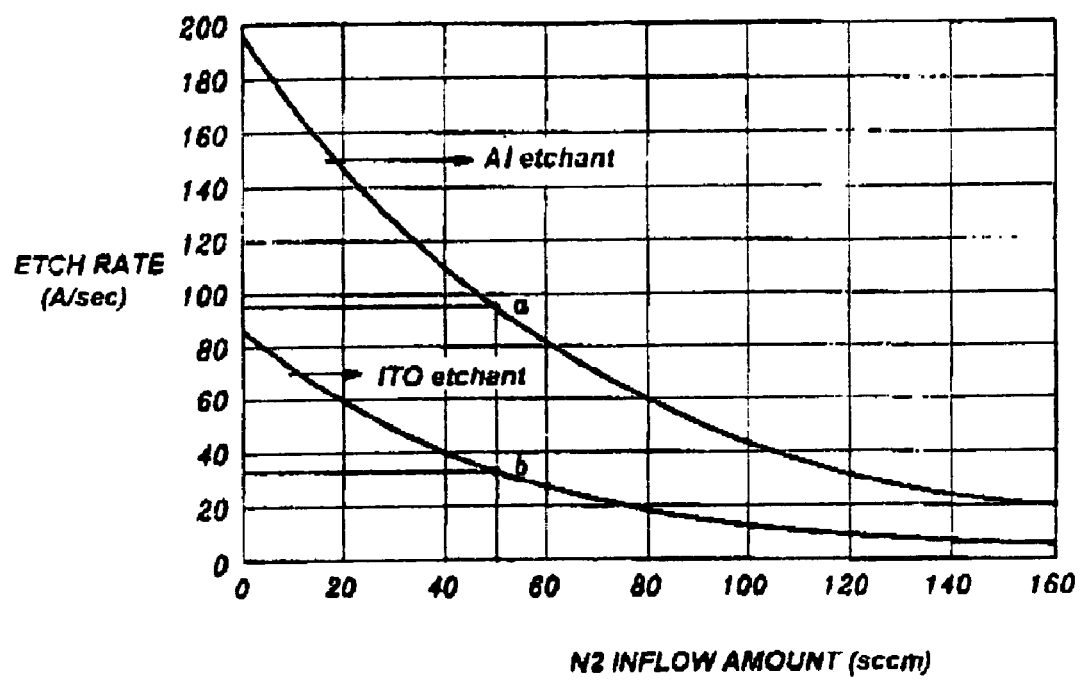
FIG. 5 is a graph illustrating etch rate of a molybdenum-tungsten alloy nitride layer as function of the volume of nitrogen gas as a reactive gas for aluminum and ITO etchants.

FIG. 5 is a graph illustrating etch rates of a molybdenum-tungsten alloy nitride layer as function of inflow amount of nitrogen gas as a reactive gas for aluminum and ITO etchants. The horizontal axis indicates the inflow amount of a nitrogen gas in sccm, and the vertical axis indicates etch rates of a molybdenum-tungsten alloy nitride layer in Å/sec for an aluminum etchant and an ITO etchants. In this experiment, the inflow amount 105 sccm of the Ar gas is fixed, and that of nitrogen gas varies from zero to 160 sccm during reactive sputtering. The etch rate of the molybdenum-tungsten alloy nitride layer for the aluminum etchant and the ITO etchant decreases as the inflow amount of nitrogen gas with respect to argon gas increases. Its etch rates for the aluminum etchant and the ITO etchant are respectively 95 Å/sec and 35 Å/sec when inflow amount of argon gas is 105 sccm and that of nitrogen gas is 50 sccm. The etch rate below 35 Å/sec implies that the etched thickness is negligible. In addition, because the mount of the ITO etchant penetrating along the narrow crack having a width of less than 100 µm of the passivation layer is very small, the etched thickness of below 35 Å/sec is ignorable. In the meantime, the etch rate depends an the ratio of argon gas and nitrogen gas. For example, when the inflow amount of the nitrogen gas is at least 50% of that of the argon gas, not only the supplementary gate and data wires 250 and 550 is simultaneously etched with the gate wire 200, 210 and 230, and the data wire 500, 510 and 520, but also the supplementary gate and data wires 250 and 550 is rarely etched for the ITO etchant.

In the drawings and specification, there have been disclosed typical preferred embodiments of the present invention and, although specific terms are employed, they are used in a generic and descriptive sense only and not for purposes of limitation, the scope of the Invention being set forth in the following claims.

What is claimed is:

1. A thin film transistor (TFT) panel, comprising;
   an insulating substrate;
   a gate wire formed on the substrate and comprising a gate line, a gate electrode and a gate pad;
   a supplementary gate wire formed on the substrate sequentially with and corresponding substantially to the gate wire;
   a gate insulating layer covering the gate wire and the supplemental gate wire;
   a semiconductor layer formed on said gate insulating layer;
   a data wire formed on the semiconductor layer and comprising a data line, a source electrode and a drain electrode;
   a supplementary data wire formed on the substrate sequentially with and corresponding substantially to the data wire;
   a passivation layer formed on the data wire, the supplementary data wire, the supplementary gate wire and the gate wire and having a first contact hole extended to the gate pad and a second contact hole extended to the drain electrode; and,
   a transparent conductive layer formed on the passivation layer and connected to the gate pad through the first contact hole and the data wire through the second contact hole, wherein
   at least one of the gate wire and the data wire comprises a metal layer and a metal nitride layer, the metal of the metal nitride layer being the same as that of the metal layer and substantially inert to an etchant used for etching the transparent layer so as to prevent the at least one gate pad and data wire from being eroded by the etchant, and
   the transparent conductive layer directly contacts an upper surface of the metal nitride layer in the first and the second holes.

2. The TFT panel of claim 1, wherein the transparent conductive layer is formed of indium tin oxide (ITO).

3. The TFT panel of claim 2, wherein the transparent conductive layer comprises:
   a gate ITO layer connected to the gate pad through the first contact hole; and a pixel electrode connected to the drain electrode through the second contact hole.

4. The TFT panel of claim 1, wherein at least one of the gate line and the data line comprises a metal or a metal alloy.

5. The TFT panel of claim 4, wherein at least one of the supplementary gate line and the supplementary data line comprises a metal nitride or a metal alloy nitride.

6. The TFT panel of claim 5, wherein the at least one of the supplementary gate line and the supplementary data line further comprises one selected from a group consisting of tungsten, chromium, zirconium and nickel.

7. A thin film transistor (TFT) panel, comprising:
   an insulating substrate;
   a gate wire formed on the substrate and comprising a gate line, a gate electrode and a gate pad;
   a supplementary gate wire formed on the substrate sequentially with and corresponding substantially to the gate wire;
   a gate insulating layer covering the gate wire;
   a semiconductor layer formed on said gate insulating layer;
   a data wire formed on the semiconductor layer and comprising a data line, a source electrode and a drain electrode;
   a supplementary data wire formed on the substrate sequentially with and corresponding substantially to the data wire;
   a passivation layer formed on the data wire, the supplementary data wire, the supplementary gate wire and the gate wire and having a first contact hole extended to the gate pad and a second contact hole extended to the drain electrode; and,
   a transparent conductive layer formed on the passivation layer and connected to the gate pad through the first contact hole and the data wire through the second contact hole, wherein
   at least one of the gate wire and the data wire comprises a main layer and a supplemental layer, the main layer comprising a metal or a metal alloy and the supplemental layer comprising a metal nitride or a metal alloy nitride in which the metal or metal alloy is the same as that of the main layer, and
   the transvarent conductive layer directly contacts an upper surface of the supplemental layer in the first and the second holes.

* * * * *